W. L. MORRIS.
DEVICE FOR MEASURING FLUID FLOW.
APPLICATION FILED NOV. 12, 1903.
967,953.  Patented Aug. 23, 1910.
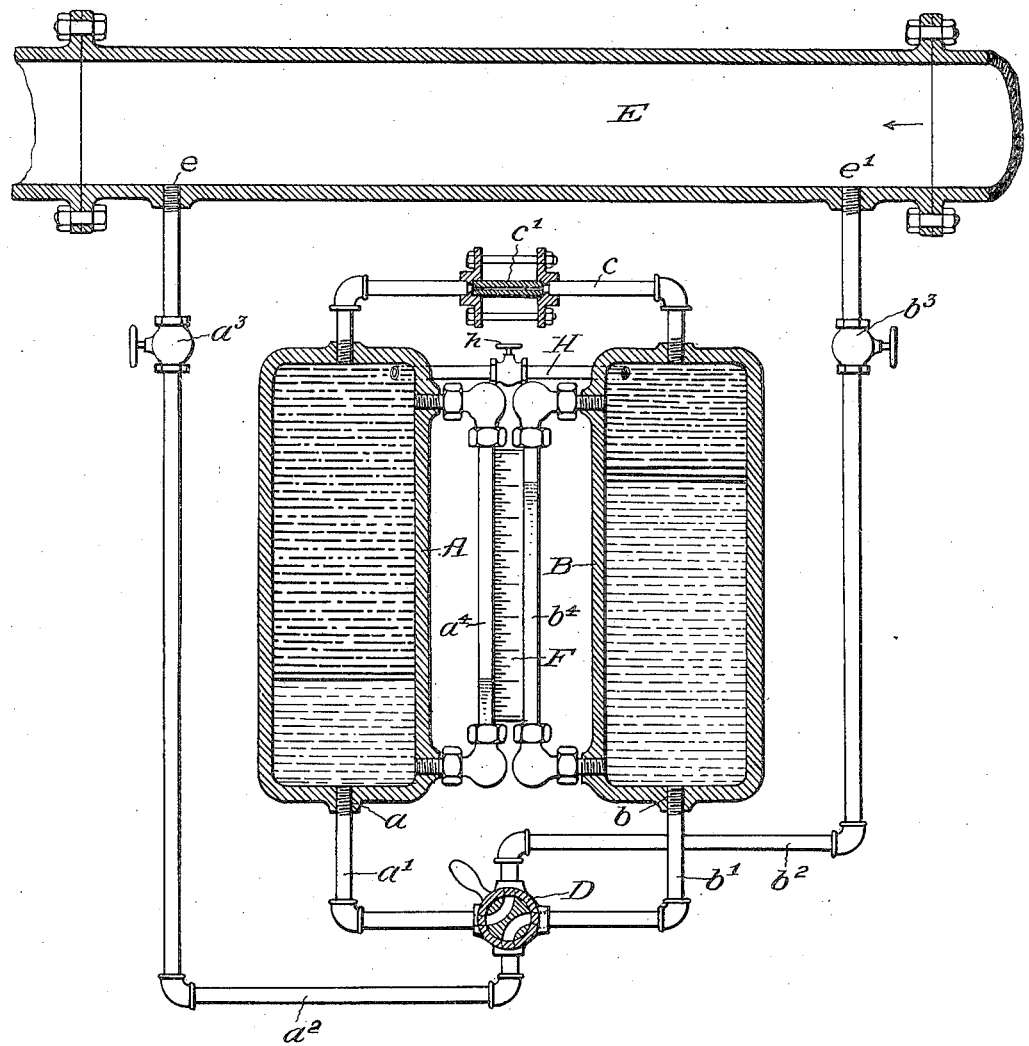
WITNESSES:
G. W. Saywell
A. E. Merkel.
INVENTOR:
Wm L. Morris,
by his attorney
J. D. Fay

UNITED STATES PATENT OFFICE.

WILLIAM L. MORRIS, OF BATAVIA, ILLINOIS.

DEVICE FOR MEASURING FLUID FLOW.

967,953.   Specification of Letters Patent.   Patented Aug. 23, 1910.

Application filed November 12, 1903. Serial No. 180,822.

*To all whom it may concern:*

Be it known that I, WILLIAM L. MORRIS, a citizen of the United States, resident of Batavia, county of Kane, and State of Illinois, have invented a new and useful Improvement in Devices for Measuring Fluid Flow, of which the following is a specification, the principle of the invention being herein explained and the best mode in which I have contemplated applying that principle, so as to distinguish it from other inventions.

My invention relates to means for measuring the flow of fluids, and particularly of water.

The object of the invention is to provide means of this character which are economical of manufacture and efficient in operation, and it consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawing, the figure represents a vertical sectional view of a device embodying my invention as particularly applied to the measurement of the flow of water through a water main or conduit.

Two receiving chambers A and B are connected with each other by means of an intermediate duct $c$ which permits a flow of liquid from one chamber to the other and includes a removable resistance portion $c'$ of a reduced cross-sectional area which is suitably introduced into the intermediate connection $c$ and is removable therefrom. The rate of liquid flow through the resistance portion $c'$ is in a known ratio to that through the conduit E, (hereinafter more fully described) and this ratio is preferably a very small fraction, say one-ten-thousandth, so that the liquid flow through the connection $c$ is greatly retarded and considerable time would elapse before an equilibrium of pressure were established. However, should an equilibrium of pressure be desired quickly, or the operator desires to start the meter upon some desired graduation of the scale F (hereinafter described), this may be afforded by a by-pass H connecting the tops of the chambers A and B and provided with a suitable cock $h$.

In the bottoms of the chambers A and B are formed openings $a$ and $b$, respectively, to which openings are connected ducts $a'$ and $b'$ connected with a four-way valve D. Two ducts $a^2$ and $b^2$ lead from this valve D and tap a water main or conduit E at the points $e$ and $e'$, respectively. These points are longitudinally removed from each other and consequently lie in zones of different pressures. As illustrated in the drawing, considering the flow to be in the direction indicated by the arrow, the pressure at $e'$ is greater than that at $e$, so that water is caused to flow through duct $b^2$, valve D, connection $a'$ chamber A, connection $c$, chamber B, connection $b'$, valve D, and duct $a^2$, in succession. If desired, in order to increase the sensitiveness of the device, the ends of the ducts $a^2$ $b^2$ may be made to project into the conduit at $e$ and $e'$, the former away from the latter toward the flow. When the meter has run through the entire amount of the receiver, the direction of flow through the chambers may be reversed by turning the valve D.

In case only one chamber A or B is used, the measuring fluid may be discharged into the line E, which would require a refilling of the receiver every time the entire amount had run through. Suitable valves $a^3$ and $b^3$ are provided for controlling the ducts $a^2$ and $b^2$, respectively. When the chambers A and B are not made of glass, suitable sight-tubes are provided and one such, $a^4$ and $b^4$, respectively, is shown connected with each of the chambers A and B, whereby the height of the liquid may be observed, and one form of scale F is shown for determining such height. A quantity of fluid of a different specific gravity than that of the fluid whose flow is to be measured and which will stand out clearly defined from the latter is introduced into the chamber, oil having color distinct from that of water being used in the case illustrated. Water is introduced into the chambers so as, in conjunction with the oil, to completely fill the same. The oil shown is of a less specific gravity than that of the fluid passing through the conduit E, but if a heavier fluid were used, as might be the case if the flow of oil in a pipe line were being measured and water were used in the meter, then the meter would be applied upside down. The graduations shown on the scale F are inches and fractional parts of the same, this being the most convenient scale for a meter that is to be used upon lines E of varying sizes and for the table of constant ratios used in connection with the same. In case the meter is to be made a fixture and used for one application only, the pipe E, distance from $e$ to $e'$, and resistance portion $c'$ being constant at all times, the scale may be graduated in gallons, cubic feet or pounds of that liquid. In case of application to a steam line the graduations would give cubic feet and by noting the steam pressure and using the weight of steam at that pressure, the number of pounds of steam can be secured. The steam pressure that would be used would be the mean pressure as shown on a steam pressure recording gage.

Since the quantity of fluid flowing through the pipe $c'$ is always in direct proportion to that flowing through the main line E, it is necessary to secure the graduations upon the scale F by calibrating the meter, either with another meter or by some system of measuring, the graduations being, as noted above, either inches, cubic feet, gallons or pounds as may be desired, depending upon the service whether it be for water, gas, oil, or steam measurement. The scale F is so graduated that the graduations at the end of the scale in the direction of the flow of the measuring liquid are slightly shorter than at the starting point, due to the fact that there is a slightly variable resistance offered to the flow through the shunt when the oil or sight lines in the tubes $a^4$ and $b^4$ are on different levels. This difference is made very slight, however, by using a measuring fluid of a specific gravity not differing much from that of the fluid whose flow is being measured.

If the meter is permanently attached, each main division of the scale F might be considered, for example, to be one thousand gallons, this having been determined by actual demonstration. The actual flow through the shunt $c'$ may be only one-one-hundredth of a gallon, or, in other words, the resistance to the flow through $c'$ would be one hundred thousand times as great as that through E. The ratio of resistances being constant, and the velocity of flows the same, the readings on the scale F would either show the flow through E direct or the flow through $c'$, and in the latter case the use of the proper constant for the special application would determine the actual flow.

It should be noted that the meter is not a continuously running device, but is adapted for periodic readings, preferably daily.
In other words, while the main conduit permits the liquid to pass in and out of it, the by-pass is designed to permit only of the movement of that liquid contained within itself. This result is attained by the construction of such by-pass including in effect two enlarged chambers that with the ducts connecting such chambers, respectively, with the main conduit afford relatively little or no resistance to the flow of the liquid therethrough compared with the resistance afforded by the resistance section $c'$ in the duct $c$ connecting such chambers with each other.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention:

1. In a fluid measuring device, a fluid conduit, a connection between two points of different pressure in said conduit, means for reversing the direction of flow through a portion of said connection, a fluid in such portion of said connection distinguishable from the fluid being measured, and means for observing the position of said distinguishable fluid.

2. In a fluid measuring device, a fluid conduit, a connection between points of different pressure in said conduit, means for reversing the direction of fluid flow through a portion of said connection, a chamber in such portion of said connection, and means for measuring the displacement of fluid from said chamber.

3. In a fluid measuring device, a fluid conduit, a connection between points of different pressure in said conduit, means for reversing the direction of fluid flow through a portion of said connection, and means for measuring the flow of fluid through such portion of said connection, such means comprising a chamber containing a fluid distinguishable from the fluid being measured.

4. In a fluid measuring device, two conduits for the fluid being measured; means for reversing the direction of fluid flow through a portion of one of said conduits; and a flow measuring device in such conduit portion, such device comprising a chamber containing a fluid distinguishable from the fluid being measured; and means for maintaining in the two conduits the same relative resistances to the flow of a fluid therethrough.

5. In a fluid measuring device, a fluid conduit; a connection between two points of different pressure in said conduit, said connection having a section offering a maximum resistance to the flow of the fluid;
means for reversing the direction of fluid flow through said section and means for measuring the flow through such section, such flow bearing a known relation to the flow in said conduit.

6. In a fluid measuring device, a fluid conduit; a second conduit connected with said first conduit at points of different pressure, said second conduit having a section offering a maximum resistance to the flow of the fluid; means for reversing the direction of fluid flow through said section and a chamber in said second conduit containing a fluid distinguishable from the fluid being measured.

7. In a fluid measuring device, a fluid conduit; a second conduit connected with said first conduit at points of different pressure, said second conduit having a section offering a maximum resistance to the flow of the fluid; means for reversing the direction of fluid flow through said section and a chamber in said second conduit containing a fluid distinguishable from the fluid being measured and adapted to indicate the amount of such contained fluid displaced by the flow of such fluid being measured.

8. In a fluid measuring device, a fluid conduit, a chamber containing a fluid distinguishable from the fluid in said conduit; ducts connecting said chamber with said conduit at points of different pressure, one of said ducts having a section adapted to offer a maximum resistance to the flow of fluid therethrough; and means for observing the amount of fluid in said chamber displaced by said flow, the relation of said flow to the flow in said conduit being known.

9. In a fluid measuring device, a fluid conduit; a chamber containing a fluid distinguishable from the fluid in said conduit; ducts connecting said chamber with said conduit at points of different pressure, one of said ducts having a removable section adapted to offer a maximum resistance to the flow of such fluid therethrough and means for observing the amount of the fluid in said chamber displaced by such flow, the relation of such flow to the flow in said conduit being known.

10. The combination of a fluid conduit, two ducts leading therefrom from points of different pressure, two receiving chambers and means for determining the amount of fluid flow therethrough, and a duct intermediate of such two chambers and including a resistance portion of reduced cross-section, said two ducts, chambers and intermediate duct being connected in series.

11. The combination of a liquid conduit, two ducts leading therefrom from points of different pressure, two receiving chambers, a quantity of liquid in said chambers of a specific gravity less than that of the liquid to be measured, sight-tubes connected with such chambers for noting the volume of such lighter fluid, and a duct intermediate of such two chambers, such two ducts, chambers and intermediate duct connected in series.

12. The combination of a liquid conduit, two ducts leading therefrom from points of different pressure, two receiving chambers, a quantity of liquid in said chambers distinguishable from the liquid to be measured, sight-tubes connected with such chambers for noting the volume of such latter liquid contained therein, and a duct intermediate of such two chambers, such two ducts, chambers and intermediate duct connected in series.

13. The combination with a fluid conduit, of two ducts connected therewith at points of different pressure, and two receiving chambers adapted to be reversibly connected in series with said two ducts, such chambers containing a quantity of fluid distinguishable from the fluid being measured, and being constructed to indicate the amount of such contained liquid displaced by the liquid being measured.

14. The combination with a fluid conduit, of two ducts connected therewith at points of different pressure; two chambers containing a quantity of fluid distinguishable from the fluid being measured; a duct joining said two chambers; and means for reversibly connecting said chambers in series with said first named ducts whereby the liquid contained in said chambers may be alternately displaced from one to the other thereof by the flow of the liquid being measured, such chambers being constructed to indicate the amount of the liquid so displaced.

15. The combination with a fluid conduit, of two ducts connected therewith at points of different pressure; two chambers containing a quantity of fluid distinguishable from the fluid being measured; a duct joining said two chambers and offering a resistance to the flow of liquid therethrough of a known relation to the resistance offered by said conduit; and means for reversibly connecting said chambers in series with said first named ducts whereby the liquid contained in said chambers may be alternately displaced from one to the other thereof by the flow of the liquid being measured, such chambers being constructed to indicate the amount of the fluid so displaced.

Signed by me, this 7th day of November, 1903.

WILLIAM L. MORRIS.

Attested by—
GRACE PETERS,
ARTHUR T. LONG.